United States Patent
Wold et al.

(10) Patent No.: US 10,897,848 B2
(45) Date of Patent: Jan. 26, 2021

(54) COMBINE HARVESTER WITH FAN SPEED ADJUST

(71) Applicant: Deere and Company

(72) Inventors: Matthew T. Wold, Coal Valley, IL (US); Glenn E. Pope, Viola, IL (US); Jeffrey R. Walter, Bettendorf, IA (US); Jacob G. Schoeny, Bettendorf, IA (US)

(73) Assignee: Deere & Company, Moline, IL (US)

( * ) Notice: Subject to any disclaimer, the term of this patent is extended or adjusted under 35 U.S.C. 154(b) by 330 days.

(21) Appl. No.: 15/917,545

(22) Filed: Mar. 9, 2018

(65) Prior Publication Data

US 2019/0274253 A1 Sep. 12, 2019

(51) Int. Cl.
*A01F 12/44* (2006.01)
*A01F 12/46* (2006.01)
*A01D 41/127* (2006.01)

(52) U.S. Cl.
CPC ........ *A01F 12/444* (2013.01); *A01D 41/1271* (2013.01); *A01D 41/1276* (2013.01); *A01F 12/446* (2013.01); *A01F 12/46* (2013.01)

(58) Field of Classification Search
CPC ...... A01F 12/444; A01F 12/446; A01F 12/46; A01D 41/1271; A01D 41/1276; A01D 41/1235
See application file for complete search history.

(56) References Cited

U.S. PATENT DOCUMENTS

| | | | |
|---|---|---|---|
| 5,775,072 A | 7/1998 | Herlitzius et al. | |
| 6,442,916 B1* | 9/2002 | Pope | A01D 41/1271 |
| | | | 56/10.2 R |
| 7,670,218 B2* | 3/2010 | Behnke | A01D 41/1276 |
| | | | 460/4 |
| 7,713,115 B2 | 5/2010 | Behnke et al. | |
| 7,846,013 B1 | 12/2010 | Diekhans | |
| 9,706,709 B2 | 7/2017 | Cracraft et al. | |
| 9,877,427 B2* | 1/2018 | Missotten | B60K 35/00 |
| 2014/0277961 A1* | 9/2014 | Blank | G05B 13/0275 |
| | | | 701/50 |
| 2016/0081271 A1 | 3/2016 | Mott et al. | |
| 2017/0094901 A1 | 4/2017 | French, Jr. et al. | |
| 2018/0000011 A1 | 1/2018 | Schleusner et al. | |
| 2019/0059232 A1* | 2/2019 | Ricketts | A01F 12/444 |

FOREIGN PATENT DOCUMENTS

| | | |
|---|---|---|
| EP | 1862056 A1 | 12/2007 |
| EP | 2517549 A1 | 10/2012 |

OTHER PUBLICATIONS

European Search Report issued in counterpart European Application No. 19161549.1 dated Aug. 22, 2019 (8 pages).

* cited by examiner

*Primary Examiner* — Michael J Zanelli
(74) *Attorney, Agent, or Firm* — Rathe Lindenbaum LLP

(57) ABSTRACT

A combine harvester may include a chaffer to separate residue from grain in crop material, a fan to direct air through and across the chaffer to carry the residue from the harvester, a sensor to output signals indicating a characteristic of the crop material upstream of the chaffer and a controller to adjust a speed of the fan based on signals from the sensor.

20 Claims, 4 Drawing Sheets

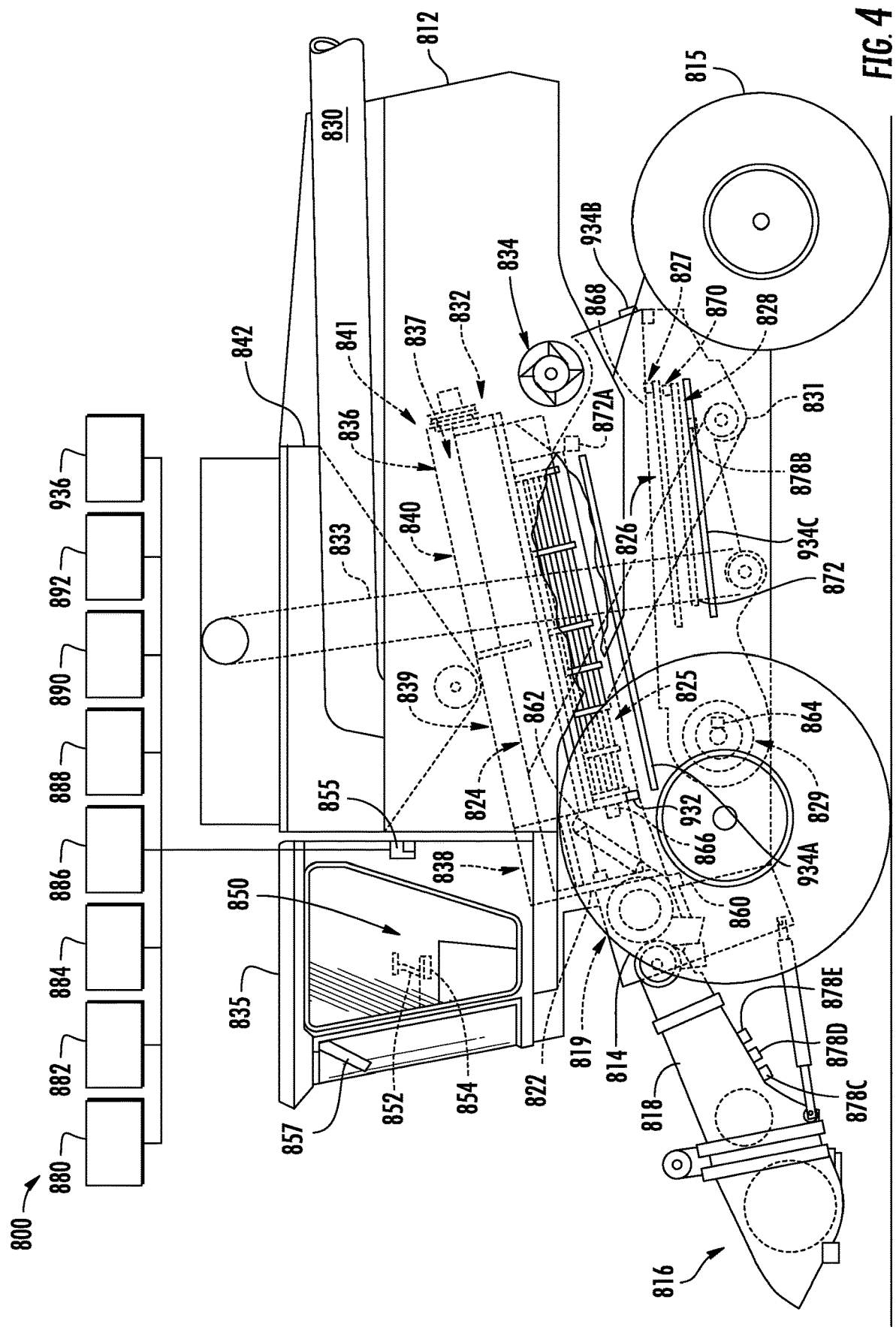

COMBINE HARVESTER WITH FAN SPEED ADJUST

BACKGROUND

Combine harvesters harvest crops by separating crop material from a growing medium and cleaning the crop material by separating grain from remaining crop material residue. Many combine harvesters utilize chaffer (sometimes returns to as an upper sieve) and a blower or fan to clean the crop material. The chaffer filters out grain from remaining crop material residue. The blower fan directs air through and across the chaffer to blow and discharge the remaining crop material residue from the combine harvester.

BRIEF DESCRIPTION OF THE DRAWINGS

FIG. 4 is a side view of an example combine harvester with portions broken away for purposes of illustration.

Figure 1:
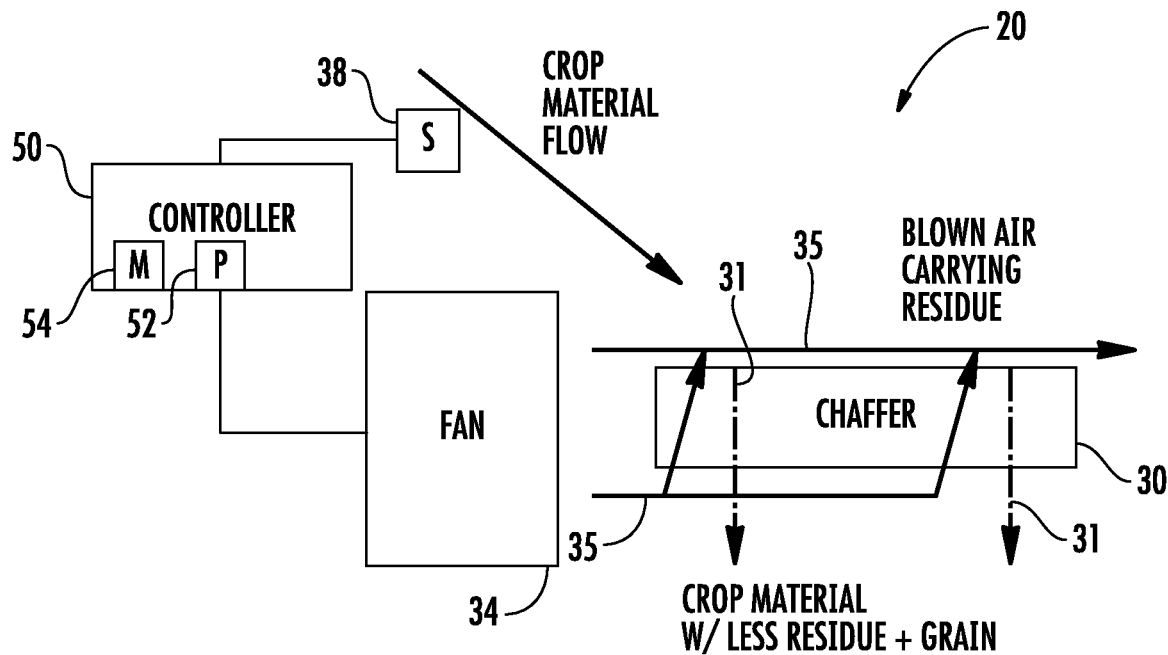
FIG. 1 is a schematic diagram illustrating portions of an example combine harvester.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example combine harvesters and methods that facilitate more efficient and effective separation of grain from the remaining crop residue. The disclosed combine harvesters and methods adjust the speed of the fan that blows air across a chaffer based at least upon a sensed flow of crop material upstream of the chaffer. The sensed flow of crop material may reflect or correspond to a crop material load, a volume or mass of crop material, that will be encountered by the chaffer in the future. The disclosed combine harvesters and methods preemptively identify or predict forthcoming changes in the crop material load upon the chaffer to more proactively and timely adjust the speed of the fan to accommodate such changes in crop material load upon the chaffer.

The predicted change in future crop material loading upon the chaffer that triggers a change in fan speed may take various forms. In one implementation, the predicted crop material loading change may be in relative terms such as an increase of an amount X or a decrease of an amount Y from a current crop material loading. In another implementation, the predicted change in crop material loading may be in absolute terms such as a crop material load having a value that exceeds a predefined threshold.

In one implementation, the fan speed or the scheduling (timing and/or magnitude) of future fan speed changes/adjustments is adjusted based directly upon changes in signals received from at least sensor upstream the chaffer and that correlate to actual load values (without actually calculating or determining an actual crop loading value (mass, volume). In another implementation, an actual crop loading estimate is calculated or determined based upon such signals, wherein the fan speed or the scheduling of future fan speed changes/adjustments is based upon the determined crop material loading. Such adjustments may be timed to are scheduled to coincide with the expected or determined time at which the chaffer is to experience the estimated load. In one implementation, such adjustments are automatic, without operator intervention. In another implementation, fan speed adjustments may be presented to an operator or manager for selection or approval prior to implementation. In some implementations, such fan speed adjustments are automatically carried out unless overridden by operator input.

The disclosed combine harvesters and methods may adjust the speed of the fan based upon additional factors such as the flow of crop material downstream of the chaffer. For purpose of this disclosure, the term "crop material" refers to an agglomeration of materials that may include both grain and crop residue in varying proportions. The term "crop residue" refers to non-grain material or material other than grain such as chaff, straw and the like. For purposes of this disclosure, unless otherwise specified, the sensing of crop material or its flow refers to the sensing of the crop material itself (the physical attributes of the crop material such as mass, moisture content, volume), the speed or rate at which crop material is flowing or is carried through the combine harvester (volume of crop material flow per unit time, mass of crop material flow per unit time, units of crop material flow per unit time) and/or the sensing of attributes of the combine harvester itself that interact with the crop material or that change in response to changes in characteristics of the crop material (such as the pressure or forces being exerted by crop material on a component of the combine harvester, the power consumed by portions of the combine harvester, or the speed or rate at which components are driven) or the rate at which crop material is flowing or carried through the combine harvester.

Disclosed is an example combine harvester that may include a chaffer to separate residue from grain in crop material, a fan to direct air across the chaffer to carry the residue from the harvester, a sensor to output signals indicating a characteristic of the crop material upstream of the chaffer and a controller to adjust a speed of the fan based on signals from the sensor.

Disclosed is an example method that may involve estimating a forthcoming load of crop material upon a chaffer of a combine harvester, directing air across the chaffer with a fan to discharge residue of the crop material from the harvester and adjusting a speed of the fan based upon the estimated forthcoming load of crop material upon the chaffer.

Disclosed is an example non-transitory computer-readable medium that contains instructions to direct the processor to estimate a forthcoming load of crop material upon a chaffer of a combine harvester based upon signals received from at least one sensor and output control signals to adjust at least one operational parameter of a fan that blows air across the chaffer, wherein the control signals are based upon the estimated forthcoming load of crop material upon the chaffer.

FIG. 1 schematically illustrates portions of an example combine harvester 20 may facilitate more efficient and effective separation of grain from the remaining crop residue. Harvester 20 estimates or predicts a forthcoming load of crop material on a chaffer. This estimate or prediction is then utilized to preemptively adjust the speed of a fan that directs air through and across the chaffer to accommodate the load estimate. Such adjustment may be timed to the expected or determined time at which the chaffer is to experience the estimated load. Harvester 20 comprises chaffer 30, and 34, sensor 38 and controller 50.

Chaffer 30 (schematically shown), sometimes referred to as an upper sieve, comprises a series of openings sized or angled to allow the passage of grain there through while inhibiting the passage of lighter and potentially larger non-grain portions of crop material, such as chaff and straw. In one implementation, chaffer 30 is shaken or reciprocated rearwardly and forwardly to facilitate the passage of grain, as indicated by arrows 31, through the chaffer. In one implementation, chaffer 30 may comprise a series of louvers. In one implementation, chaffer 30 may be part of a cleaning shoe of a harvester, wherein chaffer 30 is supported above underlying or lower seives that further separate grain from material other than grain (MOG). In one implementation, chaffer 30 comprises a first of a series of grain cleaning or filtering structures or panels, wherein crop material is directed onto the top of the chaffer from an initial thresher, such as a rotor and/or or straw walker.

Fan 34 (schematically shown), sometimes referred to as a blower, generates pressurized air flow and directs the air flow through and across chaffer 30, as indicated by arrows 35, to carry residue away from the chaffer to a discharge opening of the harvester. In one implementation, fan 34 directs and air so as to carry the crop residue to a residue spreader. The airflow generated by fan 34 assists in separating the grain from the crop residue. In some implementations, harvester 20 may comprise a series of fans 34.

Sensor 38 comprises a sensing device that outputs signals indicating a characteristic of the crop material upstream of chaffer 30. For purposes of this disclosure, the term "upstream" refers to the overall general direction which crop material flows through combine harvester 20, flowing downstream from a state where the crop is initially separated from the growing medium (the soil) at a front or head of the combine harvester 20 towards either a grain tank of harvester 20 or a rear discharge location, such as a residue spreader. The term "upstream" with respect to chaffer 30 refers to a location along the general passage that crop material flows through harvester 20, wherein the crop material reaches and flows past the location before reaching chaffer 30.

The signals output by sensor 38 may indicate a characteristic of the crop material itself (the physical attributes of the crop material such as mass, moisture content, volume), the speed or rate at which crop material is flowing or is carried through the combine harvester (volume of crop material flow per unit time, mass of crop material flow per unit time, units of crop material flow per unit time) and/or the sensing of attributes of the combine harvester itself that interact with the crop material or that change in response to changes in characteristics of the crop material (such as the pressure being exerted by crop material on a component of the combine harvester, the power consumed by portions of the combine harvester, or the speed or rate at which components are driven) or the rate at which crop material is flowing or carried through the combine harvester. Such signals facilitate the estimation of a forthcoming load of crop material upon chaffer 30.

In one implementation, sensor 38 may comprise a sensor which senses force exerted upon a rotor of the harvester by crop material (such as a pressure sensor or strain sensor). In another implementation, sensor 38 may comprise a sensor that senses the power consumed to rotate the rotor. In yet another implementation, sensor 38 may comprise a sensor that senses the rotational speed of the rotor. In yet other implementations, sensor 38 may comprise other types of sensors and/or may detect the force is exerted upon, the power consumed by or the speed of a different component that directly or indirectly interacts with the crop material upstream of chaffer 30.

Controller 50 controls the operation of fan 34 based upon signals from sensor 38. Controller 50 adjusts a speed of the fan based upon signals from sensor 38. In one implementation, controller 50 comprises an integrated circuit, such as an application specific integrated circuit. In another implementation, controller 50 comprises a processor 52 that follows instructions provided by a non-transitory computer-readable medium or memory 54. In one implementation, controller 50 utilizes signals received from sensor 38 to estimate or predict a forthcoming load of crop material upon chaffer 30. In one implementation, the magnitude of the speed adjustment controlled by controller 50 is based upon the magnitude of the estimated crop load. In one implementation, controller 50 further estimates a time or timing at which the estimated load will be placed upon chaffer 30. In such an implementation, controller 50 may output control signals causing the speed of fan 34 to be adjusted at or just before the estimated time at which the estimated load we placed upon chaffer 30.

Because controller 50 estimates a forthcoming load upon chaffer 30 based upon signals from the upstream sensor 38, the speed of fan 34 may be more timely and proactively adjusted based upon the forthcoming load. For example, the fan speed may be increased to accommodate heavier loads. The fan speed may be reduced when crop material loads upon chaffer 30 are lighter. As a result, the separation of crop material into grain and MOG may be enhanced to reduce grain loss and the operation of fan 34 may be more efficient in that energy consumption may be reduced. In some implementations, the enhanced efficiency of fan 34 due to the dynamic adjustment of its speed based upon forthcoming estimated chaffer loading may facilitate the use of smaller and/or less expensive fans, facilitating compactness and reducing cost.

Figure 2:
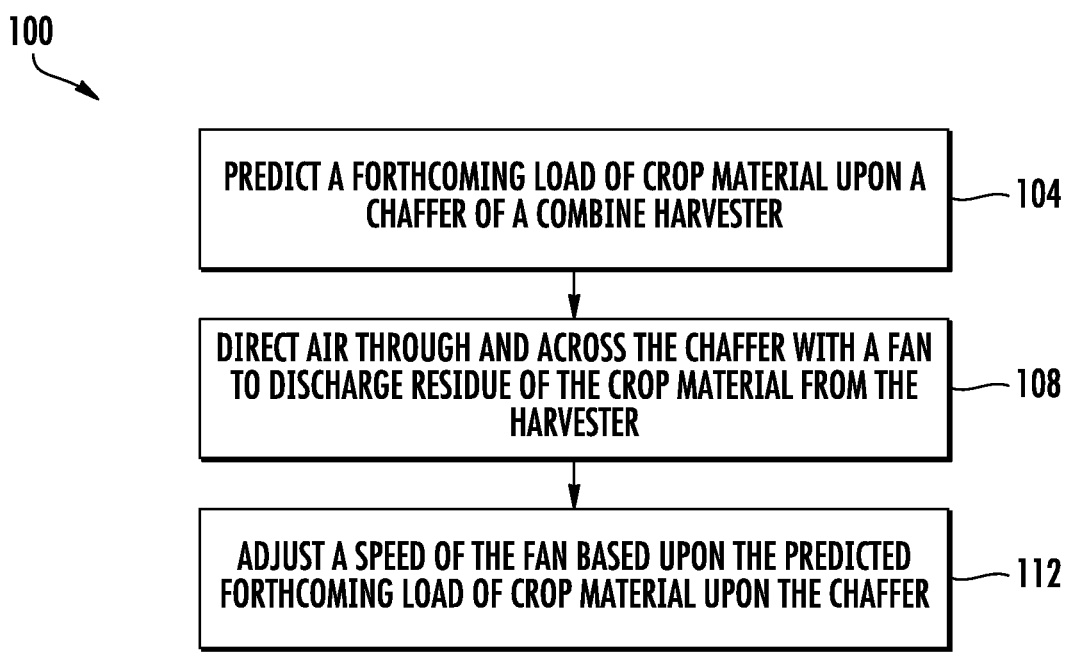
FIG. 2 is a flow diagram of an example crop material separation method.

FIG. 2 is a flow diagram of an example crop material separation method 100. Method 100 provides enhanced separation of grain from crop residue by dynamically controlling the speed of a fan based upon an estimate of a forthcoming load upon the downstream chaffer. Although method 100 is described in the context of being carried out by combine harvester 20, it should be appreciated that method 100 may likewise be carried out with any of the combine harvesters that are described or other similar combine harvesters.

As indicated by block 104, a forthcoming load of crop material upon a chaffer, such as chaffer 30, of a combine harvester is estimated. This estimation may be carried out by a controller 50 based upon signals received from at least one sensor 38 located upstream of chaffer 30.

As indicated by block 108, air is directed through and across the chaffer with a fan, such as fan 34, to discharge residue of the crop material from the harvester. In one implementation, the residue is carried off of chaffer 30 to a discharge opening. In one implementation, the residue is directed to a chopper and possibly to a spreader which distributes the residue.

As indicated by block 112, a speed of fan 34 is adjusted based upon the estimated forthcoming load of crop material upon the chaffer. In one implementation, such adjustments may be continuous and proportional to the estimated load of crop material. For example, for every increase in the unit of force, the speed of fan 34 is increased by a corresponding or proportional amount of speed. For every decrease and the unit of force, the speed of fan 34 is decreased by a corresponding or proportional amount of speed.

In another implementation, such adjustments may be carried out in a stepwise manner in response to individual chaffer loading thresholds being satisfied. For example, in response to the predicted chaffer load exceeding a first threshold, the speed of fan 34 may be increased to a first speed. In response to the predicted chaffer load exceeding a second threshold greater than the first threshold, the speed of fan 34 may be increased to a second greater speed. Likewise, in response to the estimated chaffer load falling below a first threshold, the speed of fan 34 may be decreased from a first speed to a second speed. In response to the predicted chaffer load falling below a second threshold, less than the first threshold, the speed of fan 34 may be decreased from the second speed to a third speed.

In one implementation, such adjustments are continuously made. In other implementations, such adjustments may be carried out in a periodic fashion, wherein the fan speed is changed at predefined time intervals based upon the forthcoming estimated crop load upon chaffer 30. For example, at every one minute interval, the predicted chaffer loading may be evaluated and the current speed of fan 34 or the planned future speed of fan 34 may be adjusted.

In one implementation, the speed of fan 34 is immediately adjusted based upon a current estimated forthcoming chaffer load, despite that the chaffer loading per the estimate or prediction has yet to occur and will occur in the future. In yet another implementation, the time at which a speed of fan 34 is adjusted is delayed based upon the time of the crop material to flow from the location at which sensor 38 is located to the location of chaffer 30 such that the time at which the speed of fan 34 is adjusted coincides with the time at which the change in loading upon chaffer 30 begins. In one implementation, the time delay is a predefined default time value. In another implementation, the time delay used by the controller is varied by the controller based upon signals indicating the speed at which crop material is flowing through the combine harvester or flowing from the location of sensor 38 to the location of chaffer 30.

Figure 3:
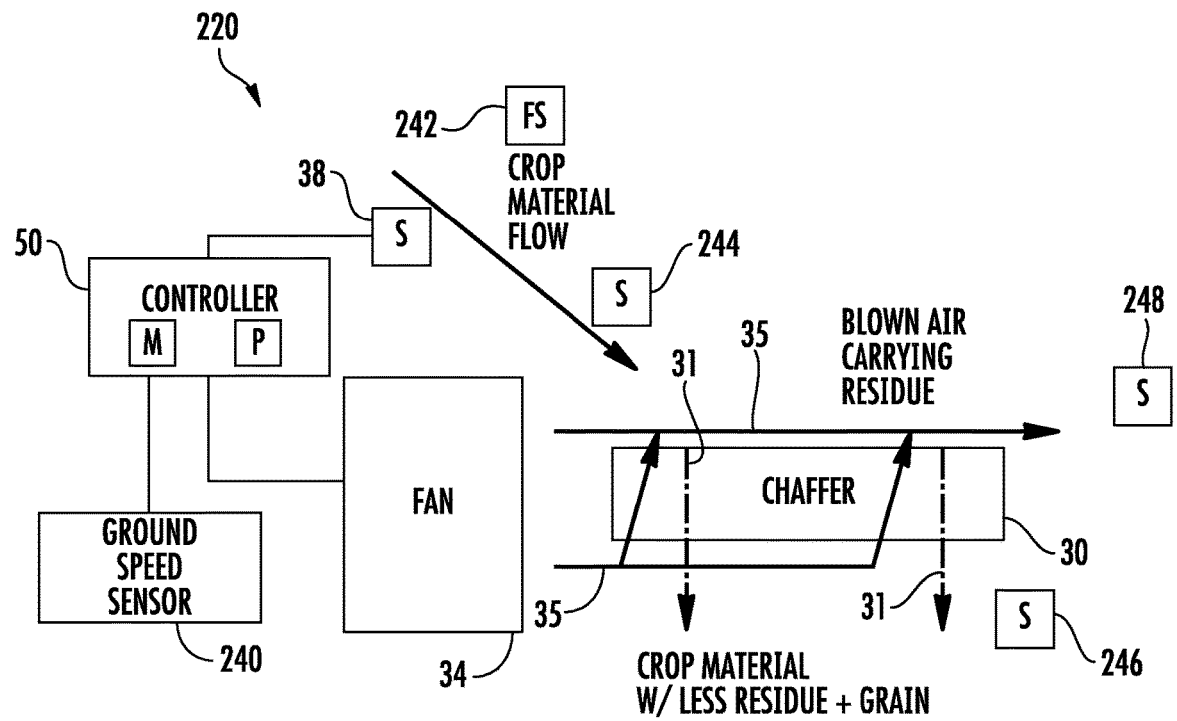
FIG. 3 is a schematic diagram illustrating portions of an example combine harvester.

FIG. 3 schematically illustrates portions of an example combine harvester 220. Combine harvester 220 is similar to combine harvester 20 described above except that combine harvester 220 additionally comprises ground speed sensor 240, flow sensor 242, upstream sensor 244, downstream sensor 246 and downstream sensor 248. Those remaining components of harvester 220 which correspond to components of harvester 20 are numbered similarly.

Ground speed sensor 240 comprise a sensor that outputs signals indicating this ground speed of the combine harvester 220. Flow sensor 242 comprise a sensor that outputs signals indicating the speed at which crop material is flowing through harvester 220. In one implementation, flow sensor 242 outputs signals that indicate the overall or average flow of crop material through harvester 220. In another implementation, flow sensor 242 outputs control signals indicating the rate at which crop material is flowing from the locations of the upstream sensor 38 and/or from upstream sensor 244 to the location of chaffer 30. In one implementation, flow sensor 242 may directly sense the flow of crop material such as with an optical sensor or camera. In another implementation, flow sensor 242 may indirectly determine speed or rate at which crop material is flowing to chaffer 30 based upon the rotational speed of components driving the crop material, such as a rotor, auger or the like, or the voltage level or power currently being consumed by such components.

Upstream sensor 244 is similar to sensor 38 in that upstream sensor 244 outputs signals indicating a characteristic of the crop material upstream of chaffer 30. The signals output by sensor 244 may indicate a characteristic of the crop material itself (the physical attributes of the crop material such as mass, moisture content, volume), the speed or rate at which crop material is flowing or is carried through the combine harvester (volume of crop material flow per unit time, mass of crop material flow per unit time, units of crop material flow per unit time) and/or the sensing of attributes of the combine harvester itself that interact with the crop material or that change in response to changes in characteristics of the crop material (such as the pressure being exerted by crop material on a component of the combine harvester, the power consumed by portions of the combine harvester, or the speed or rate at which components are driven) or the rate at which crop material is flowing or carried through the combine harvester. Such signals facilitate the estimation of a forthcoming load of crop material upon chaffer 30.

In one implementation, upstream sensor 244 is the same type of sensor as sensor 38, but located at a different location upstream of chaffer 30. In another implementation, upstream sensor 244 may comprise a different type of sensor that differently measures or senses a characteristic of the crop material. In such an implementation, upstream sensor 244 may further validate the estimate a forthcoming chaffer loading determined based upon signals from sensor 38. In such an implementation, the estimate for the forthcoming loading of chaffer 30 may be based upon a combination of signals from both sensor 38 and upstream sensor 244. In one implementation, different weightings may be applied to the values or signals received from sensors 38 and 244 based upon the relative accuracies of such sensors and/or based upon their proximity to chaffer 30. For example, the values based upon signals from sensor 244, being closer to chaffer 30, may be given a greater weight as compared to the values based upon signals from sensor 38.

In some implementations, the different values based upon the signals from sensors 38 and 244 may be given different weights based upon the current harvesting conditions. For example, the type of sensor serving as sensor 244 may be more accurate for a given harvesting condition as compared to sensor 38. Alternatively, the type of sensor serving at sensor 244 may be less accurate for a another given harvesting condition as compared to sensor 38. Based upon the dynamic determination of the ongoing harvesting condition, different weights may be applied. Examples of such different harvesting conditions that may trigger the application of different weightings to the signals from the different types of sensors 38, 244 may include, but are not limited to, a grain moisture content, combine harvester orientation (pitch or roll), crop material flow speed, temperature, type of crop or type of grain and the like. Although harvester 220 is illustrated as comprising two upstream sensors 38, 244, in other implementations, additional upstream sensors may be provided, wherein signals from the upstream sensors may be used independently for validation or in combination with one another by controller 52 estimate forthcoming chaffer loading which is used to adjust the speed of fan 34.

Downstream sensors 246 and 248 output signals indicating characteristics of the crop material (grain, MOG or a combination thereof) after the crop material has passed chaffer 30. Downstream sensor 246 outputs signals indicating at least one characteristic of the crop material that is passed through chaffer 30, wherein the crop material will likely contain less crop residue in addition to grain. Downstream sensor 248 output signals indicating at least one characteristic of the crop material that is not pass through chaffer 30, but has been blown away, off of chaffer 30 in a generally rearward direction by the air blown from fan 34. Such crop material may largely comprise crop material residue. In one implementation, downstream sensors 246 and 248 may comprise vibration sensors or impact plates that sense the impact of crop material there against. In another implementation, downstream sensors 246 and 248 may comprise optical sensors that sense the passage of crop material through a volume in which light or other electromagnetic radiation is emitted and detected. In such implementations, the attenuation of electromagnetic radiation, such as infrared radiation, by the crop material may be sensed to output signals that indicate the characteristic of the crop material. In yet other implementations, downstream sensor 246 and 240 may have other forms.

In the example illustrated, controller 50 estimates a forthcoming loading upon chaffer 30 additionally based upon signals from at least one of sensors 240, 242, 244, 246 and 248. In one implementation, a first chaffer loading estimate may be based upon signals from a portion of such sensors, wherein signals from the other of such sensors are used to estimate a secondary chaffer loading value to confirm or validate the first chaffer loading value. In another implementation, the estimated forthcoming loading upon chaffer 30 may be based upon a combination of signals from each of such sensors. As with the signals from sensor 244, the signals from sensors 240, 246 and 248 may likewise be differently weighted either in a static fashion or in a dynamic fashion based upon ongoing harvesting conditions.

In one implementation, the forthcoming chaffer loading estimate may be based upon signals from sensors 38, 240 and 244, wherein the signals from the downstream sensors 246 and 248 provide a closed loop feedback for adjusting future chaffer loading estimates based upon signals from sensor 38, 240 and 244. For example, the mass or volume of crop material that is passed chaffer 30 as indicated by a combination of the signals from downstream sensors 246 and 248 may be compared to the chaffer loading estimate. In such an implementation, discrepancies between such values may trigger a change in conversion factors used to convert the value of signals from sensors 38, 244 into chaffer loading estimates.

In one implementation, the forthcoming chaffer loading estimate may be based upon signals from sensors 38, 240 and 244, wherein the signals from the downstream sensors 246 and 248 are used by controller 50 to adjust the timing at which fan speed adjustments are made or the amount of such adjustments. Controller 50 may adjust thresholds used to trigger a fan speed adjustment and/or the amount of fan speed adjustment per a given unit of the estimated chaffer loading. For example, signals from sensor 248 may indicate that the crop residue may be carrying an amount of grain that exceeds a predefined threshold. In response to such an occurrence, controller 50 may lower the amount by which the fan speed is increased for a given unit of estimated chaffer loading. In response to such an occurrence, controller 50 may increase the threshold for the estimated chaffer loading at which the fan speed is increased.

Figure 3A:
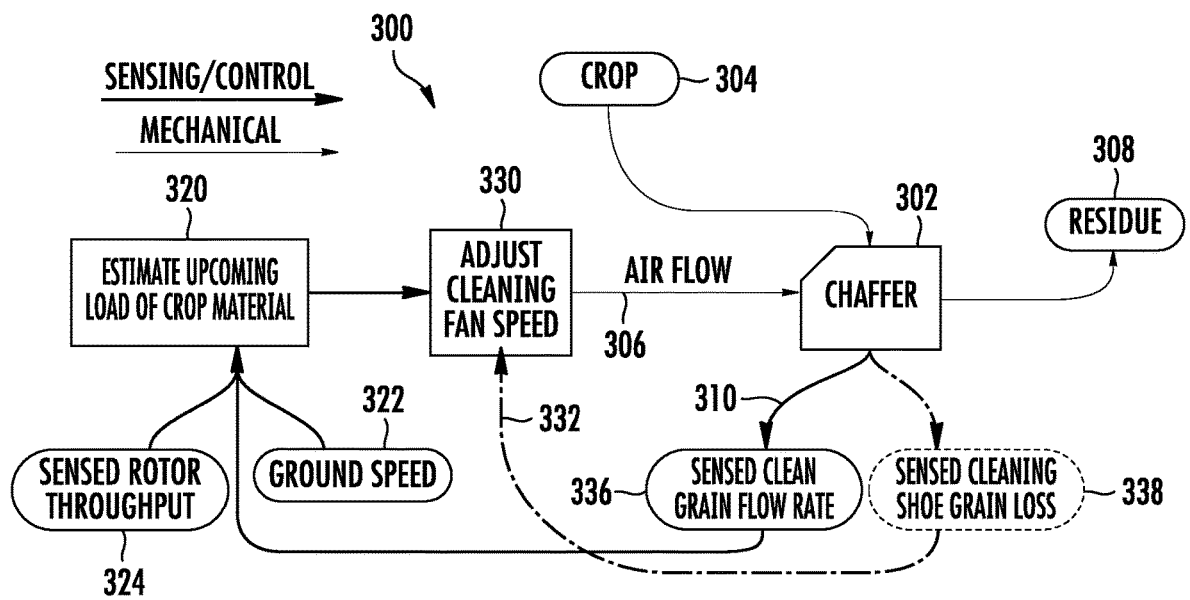
FIG. 3A is a flow diagram of an example crop material separation method.

FIG. 3A is a flow diagram of an example crop material separation method 300. Method 300 provides enhanced separation of grain from crop residue by dynamically controlling the speed of a fan based upon an estimate of a forthcoming load upon the downstream chaffer. Although method 300 is described in the context of being carried out by combine harvester 220, it should be appreciated that method 300 may likewise be carried out with any of the combine harvesters that are described or other similar combine harvesters.

As indicated by block 302, a chaffer, such as chaffer 30 described above receives both crop material flow 304 and air flow 306 from the cleaning fan, such as fan 34. This results in residue 308 being discharged while clean grain 310 passes through chaffer 302. As indicated by block 320, the upcoming load of crop material upon chaffer 302 is estimated or predicted. Such a prediction or estimate may be an actual value of loading or may be a relative prediction such as an increase of X percent or increase of X units (volume or mass).

In the example illustrated, the predicted upcoming load of crop material upon chaffer 30 may be based upon various signals or sense values taken upstream of the chaffer such as the ground speed 322 of the combine harvester as sensed by ground speed sensor 240 as well as the sensed throughput of the rotor 324. The sensed rotor throughput 324 may be determined from signals from an upstream sensor, such as a sensor similar to sensor 38 and/or 244 described above.

As indicated by block 330, based upon the estimated or predicted upcoming load of crop material upon the chaffer 30, the speed of the cleaning fan, such as fan 34, is adjusted. It impacts the stream of air flow 306 passing through the chaffer. As indicated by broken lines 332, in some implementations, signals from at least one sensor downstream of chaffer 30 (similar to the above described use of downstream sensors 246 and 248) may further be utilized to adjust the speed of the cleaning fan. In the example illustrated, the flow rate of clean grain 336 and/or the sensed grain loss 338 may be further used in combination with the predicted upcoming load of crop material upon the chaffer to adjust the cleaning fan speed.

FIG. 4 illustrates portions of an example combine harvester 800. Harvester 800 is similar to harvester 220 described above in that harvester 800 controls the adjustment of fan speed based upon an estimated forthcoming crop material loading of a chaffer. FIG. 4 is a side view of portions of harvester 800.

As shown by FIG. 4, harvester 800 comprises a main frame 812 having wheel structure including front and rear ground engaging wheels 814 and 815 supporting the main frame for forward movement over a field of crop to be harvested. The front wheels 814 are driven by an electronically controlled hydrostatic transmission.

A vertically adjustable header or harvesting platform 816 is used for harvesting a crop and directing it to a feeder house 818. The feeder house 818 is pivotally connected to the frame 812 and includes a conveyor for conveying the harvested crop to a beater 819. The beater 819 directs the crop upwardly through an inlet transition section 822 to a rotary threshing and separating assembly 824. In other implementations, other orientations and types of threshing structures and other types of headers 816, such as transverse frame supporting individual row units, are utilized.

The rotary threshing and separating assembly 824 threshes and separates the harvested crop material. Grain and chaff fall through separation grates of a concave 825 on the bottom of the assembly 824 to a cleaning system 826, and are cleaned by a chaffer 827 and a sieve 828 and air fan 829. The cleaning system 826 removes the chaff and directs the clean grain to elevator 833. Clean grain elevator 833 conveys the grain to grain tank 842. The clean grain in the tank 842 can be unloaded into a grain cart or truck by unloading auger 830. Tailings fall into the return elevator or auger 831 and are conveyed to the rotor 837 where they are threshed a second time.

Threshed and separated straw is discharged from the rotary threshing and separating assembly 824 through an outlet 832 to a discharge beater 834. The discharge beater 834, in turn, propels the straw out the rear of the combine. It should be noted that the discharge beater 834 could also discharge crop material other than grain directly to a straw chopper. The operation of the combine is controlled from an operator's cab 835.

In the example illustrated, the rotary threshing and separating assembly 824 comprises a cylindrical rotor housing 836 and a rotor 837 located inside the housing 836. The front part of the rotor and the rotor housing define the infeed section 838. Downstream from the infeed section 838 are the threshing section 839, the separating section 840 and the discharge section 841. The rotor 837 in the infeed section 838 is provided with a conical rotor drum having helical infeed elements for engaging harvested crop material received from the beater 819 and inlet transition section 822.

In the threshing section 839, the rotor 837 comprises a cylindrical rotor drum having a number of threshing elements for threshing the harvested crop material received from the infeed section 838. Downstream from the threshing section 839 is the separating section 840 wherein the grain trapped in the threshed crop material is released and falls to the cleaning system.

An operator's console 850 located in the cab 835 includes conventional operator controls including a hydro shift lever 852 for manually controlling the speed range and output speed of the hydrostatic transmission. An operator interface device 854 in the cab 835 allows entry of information into a controller 855 comprising an on-board processor system, which provides automatic speed control and numerous other control functions described below for the harvester 800. The operator can enter various types of information into the operator interface device 854, including crop type, location, yield and the like. In the example illustrated, combine harvester 800 additionally comprises display 857 for presenting information to the operator. In some implementations, display 857 may additionally serve as an input device, such as when display 857 comprises a touch screen. In other implementations, display 857 may be combined with interface device 854.

Controller 855 sees multiple signals from sensors throughout harvester 800. Signals from the sensors include information on environmental variables such as relative humidity, and information on variables controlled by the on-board control system. Signals include vehicle speed signals from a radar sensor or other conventional ground speed transducer 860, rotor and fan speed signals from transducers 862 and 864, respectively, and concave clearance and chaffer and sieve opening signals from transducers 866, 868 and 870, respectively. Signals from a grain moisture sensor 878A, a tailings volume sensor 878B, and relative humidity, temperature and material moisture sensors 878C, 878D and 878E are also provided.

A bus directs signals from the mentioned sensors and an engine speed monitor, a grain mass flow monitor, and other microcontrollers on the harvester to the controller 855. Signals from the operator interface 854 are also directed to the controller 855. The controller 855 is connected to actuators for controlling adjustable elements on the harvester. Feedback signals from the actuators are input to the controller 855.

The actuators controlled by the controller 855 comprise an actuator 880 controlling the rotational speed of the rotary threshing and separating assembly 824, an actuator 882 controlling the clearance of the concave 825, an actuator 884 controlling the opening of a pre-cleaner of the chaffer 827, an actuator 886 controlling the opening width of the chaffer 827, an actuator 888 controlling the opening of the sieve 828, an actuator 890 controlling the speed of the air fan 829, and an actuator 892 controlling the output speed of the hydrostatic transmission and thus the ground speed of the combine. These actuators are known in the art and thus only schematically indicated in FIG. 4. In some implementations, controller 855 may adjust the operational parameters of harvester 800 based upon the determined grain mass flow or grain yield (determined based upon signals from material flow sensor 934) by outputting control signals to one or more of actuators 880-892.

As further shown by FIG. 4, harvester 800 additionally comprises rotor pressure sensor 932, material flow sensors 934A, 934B and 934C (collectively referred to as material flow sensors 934 and power monitor 936 (schematically shown). Rotor pressure sensor 932 comprises a sensor mounted to or formed upon portions of rotor 837 so as to sense forces exerted upon rotor 837 by crop material. For example, in one implementation, sensor 932 may comprise an accelerometer. In another implementation, sensor 932 may comprise a capacitive sensor coated upon a portion of rotor 837. In yet other implementations, sensor 932 may comprise other pressure sensing devices coupled to rotor 837 so as to sense forces exerted upon rotor 837 by crop material.

Material flow sensors 934 output signals indicating the flow of crop material. Material flow sensor 934A is similar to sensor 38 or 244 described above. Material flow sensor 934A Is located upstream of chaffer 827 to output signals indicating the actual passage of the crop material itself flowing towards chaffer 827.

Material flow sensors 934B and 934C are similar to sensors 248 and 246, respectively, described above. Material flow sensor 934B is located downstream of chaffer 827 and outputs signals indicating the actual passage of crop material after it has been blown off of the top of chaffer 827 or is been blown off of the underlying sieves. At such a location, material flow sensor 934B senses crop material being discharged from harvester 800 which may largely consist of crop residue. Material flow sensor 934B may output signals that indicate potential crop loss in the form of grain that is being discharged.

Material flow sensor 934C is located downstream of chaffer 827 and output signals indicating actual passive crop material that is passed through chaffer 827. As such a location, material flow sensor 934C outputs signals indicating the volume or mass of grain that is been extracted from the crop material. Such signals may be impacted by the amount of MOG still entrained with the grain. In one implementation, material flow sensor 934C is located at the bottom of the cleaning system, below the lower most sieve and augurs 831, 833. In other implementations, material flow sensor 934C may be located immediately below chaffer 827.

In the example illustrated, material flow sensors 934 are each individually similar to material flow sensor 28 described above. In one implementation, each of material flow sensors 934 may have an emitter-detector arrangement such as described in co-pending U.S. patent application Ser. No. 15/844,523 filed on Dec. 16, 2017 and entitled HARVESTER WITH ELECTROMAGNETIC PLANE CROP MATERIAL FLOW SENSOR by Dybro et al., the full disclosure of which is hereby incorporated by reference. As such, each of material flow sensors 934 forms an electromagnetic plane that extends across a volume through which crop material flows.

In other implementations, material flow sensors 934 are each a similar type of material flow sensor. In other implementations, the type of material flow sensors may vary amongst sensors 934. For example, material flow sensor 934A may be a different type as compared to material flow sensors 934B and/or 934C. in other implementations, material flow sensor 934 may comprise other types of sensors that output signals indicating the passage of the crop material itself. For example, in other implementations, at least one of material flow sensor 934 may comprise an impact plate situated across a portion of the region through which crop material flows, wherein the total crop flow is determined based upon signals from the impact plate and its location and size relative to the overall area through which crop material flows. In other implementations, other types of material flow sensors may be utilized.

Power monitor 936 (schematically shown) comprises electronic circuitry that outputs signals indicating the ongoing occurrence power being consumed to drive at least one component of stream of chaffer 827 that interacts with the crop material. In one implementation, power monitor 936 output signals indicating the power consumed to rotatably drive rotor 837. In some implementation, power monitor 936 may additionally output signals indicating the power being consumed by components downstream of chaffer 827 that interact with the flow of crop material. Such signals may be utilized in a fashion similar to the use of signals provided by crop material flow sensors 934B and 934C, similar to the use of the signals from downstream sensors 246 and 248 as described above. In one implementation, power monitor 936 may monitor electrical power. For example, power monitor 936 may monitor the voltage levels, wattage or other power measurements that vary in response to the load of crop material being interacted upon by the at least one crop interacting component. In other implementations, power monitor 936 may monitor hydraulic or pneumatic power being consumed. Such signals are transmitted to controller 855.

Controller 855 is similar to controller 50 described above in that, in addition to controlling various other operations of harvester 800 as described above, controller 855 additionally output control signals adjusting the speed of fan 829 based upon a predicted forthcoming or future crop material load upon chaffer 827 based upon signals from at least one sensor located upstream of chaffer 827.

The predicted change in future crop material loading upon the chaffer 827 may take various forms. In one implementation, the predicted change may be in relative terms such as an increase of X or a decrease of Y from a current crop material loading. In another implementation, the predicted change may be in absolute terms such as a crop material load having a value that exceeds a predefined threshold.

In one implementation, predicted forthcoming change in crop material loading upon chaffer 827 is based directly upon changes in signals received from at least sensor upstream the chaffer and that correlate to actual load values (without actually calculating or determining an actual crop loading value (mass, volume). For example, controller 855 may output control signals changing the speed of fan 829 or changing the scheduled speed of fan at a future time based upon changes in speed of rotor 837 from sensor 862 and/or based upon changes in pressure as indicated by sensor 932, wherein such fan speed changes are made in response to the speed and/or pressure values exceeding predefined thresholds without actually determining a value for the crop material load itself which may correspond to such speeds and/or pressures. In another implementation, controller 855 may calculate or determine an actual crop loading estimate based upon such signals, wherein the fan speed or the scheduling of future fan speed changes/adjustments is based upon the determined crop material loading. For example, controller 855 may utilize changes in pressure and/or changes in force from sensors 932 and 862 to calculate a change in actual future crop material load, wherein the estimated change in actual future crop material load is used as a basis for adjusting fan speed.

Such fan speed adjustments may be timed or scheduled so as to coincide with the expected or determined time at which the chaffer 827 is to experience the estimated load. In one implementation, such adjustments by controller 855 are automatic, without operator intervention. In another implementation, fan speed adjustment recommendations may be presented by controller 855 to an operator or manager for selection or approval prior to implementation. In some implementations, such fan speed adjustments are automatically carried out by controller 855 unless overridden by operator input.

In one implementation, such adjustments may be continuous and proportional to the predicted future load of crop material. For example, for every increase in the unit of force, the speed of fan 829 is increased by a corresponding or proportional amount of speed. For every decrease and the unit of force, the speed of fan 829 is decreased by a corresponding or proportional amount of speed.

In another implementation, such adjustments may be carried out by controller 855 in a stepwise manner in response to individual chaffer loading thresholds being satisfied. For example, in response to the predicted chaffer load exceeding a first threshold, the speed of fan 829 may be increased to a first speed. In response to the predicted chaffer load exceeding a second threshold greater than the first threshold, the speed of fan 829 may be increased to a second greater speed. Likewise, in response to the predicted chaffer load falling below a first threshold, the speed of fan 829 may be decreased from a first speed to a second speed. In response to the predicted chaffer load falling below a second threshold, less than the first threshold, the speed of fan 829 may be decreased from the second speed to a third speed.

In one implementation, such adjustments are continuously made. In other implementations, such adjustments may be carried out in a periodic fashion, wherein the fan speed is changed at predefined time intervals based upon the predicted forthcoming crop load upon chaffer 827. For example, at every one minute interval, the estimated chaffer loading may be evaluated and the current speed of fan 829 or the planned future speed of fan 829 may be adjusted.

In one implementation, the speed of fan 829 is immediately adjusted based upon a current estimated forthcoming chaffer load, despite that the chaffer loading per the estimate has yet to occur and will occur in the future. In yet another implementation, the time at which a speed of fan 829 is adjusted is delayed based upon the time of the crop material to flow from the location at which at least one upstream sensor is located to the location of chaffer 827 such that the time at which the speed of fan 829 is adjusted coincides with the time at which the change in loading upon chaffer 827 begins. In one implementation, the time delay is a predefined default time value. In another implementation, the time delay used by the controller is varied by the controller based upon signals indicating the speed at which crop material is flowing through the combine harvester or flowing from the location of at least one upstream sensor to the location of chaffer 827. In one implementation, the location used for determining the delay for adjustment of the fan speed may be based upon the location of the sensor who signals have the greatest weight in the estimation of the forthcoming chaffer crop material loading.

In one implementation or selected mode of operation, controller 855 may adjust the speed of fan 829 based upon signals from a single upstream sensor, such as from pressure sensor 932, rotor speed sensor/transducer 862 or mass flow sensor 934A. In such an implementation, upstream sensor 244 may further validate the predicted forthcoming chaffer loading determined based upon signals from one of such upstream sensors using signals from the other of such upstream sensors. In other implementations implementation, controller 855 may predict the forthcoming loading of chaffer 827 using a combination of signals from multiple upstream sensors, such as from at least two of sensors 862, 932 and 934A. In one implementation, different weightings (percent or proportion relative to signals of other sensors with respect to determining whether to change fan speed or to what extent a fan speed adjustment should be made) may be applied to the values or signals received from the different sensors based upon the relative accuracies of such sensors and/or based upon their proximity to chaffer 827. For example, the values based upon signals from sensor 934A, being closer to chaffer 827, may be given a greater weight as compared to the values based upon signals from sensor 862 or 932. In some implementations, different sensors may be each be given non-zero weightings.

In some implementations, the different signals from the different upstream sensors 862, 932 and 934A may be given different weights based upon the current harvesting conditions. For example, sensor 932 may be more accurate for a given harvesting condition as compared to the other sensors 862 or 934B. Alternatively, sensor 932 may be less accurate for another given harvesting condition as compared to the other upstream sensors. Based upon the dynamic determination of the ongoing harvesting condition, different weights may be applied. In some implementations, different sensors may each be given nonzero weights. In some circumstances, a particular sensor or a group of particular sensors may be given zero weightings under certain harvesting conditions, where signals from the sensors are not employed. Examples of such different harvesting conditions that may trigger the application of different weightings to the signals from the different types of sensors 862, 932 and 934A may include, but are not limited to, a grain moisture content, combine harvester orientation (pitch or roll), crop material flow speed, temperature, type of crop or type of grain and the like. Although harvester 800 is illustrated as comprising the different upstream sensors 862, 932 and 934A, in other implementations, additional upstream sensors may be provided, wherein signals from the upstream sensors may be used independently for validation or in combination with one another by controller 855 to predict forthcoming chaffer loading which is used to adjust the speed of fan 829.

In one implementation, the forthcoming chaffer loading estimate may be based upon signals from at least one of upstream sensors 862, 932 and 934A, wherein the signals from the downstream sensors 934B and 934C provide a closed loop feedback for adjusting future chaffer loading estimates based upon signals from those upstream sensors. For example, the mass or volume of crop material that is passed chaffer 827 as indicated by a combination of the signals from downstream sensors 934B and 934C may be compared to the prior predicted chaffer loading. In such an implementation, discrepancies between such values may trigger a change threshold levels for sensed parameters that correlate to crop loading and that are used for changing fan speed or may trigger a change in conversion factors used to convert the value of signals from sensors sensor 862 and/or sensor 932 into actual crop material load values.

In one implementation, the predicted forthcoming chaffer loading may be based upon signals from at least one of the upstream sensors 862, 932, 934A, wherein the signals from the downstream sensors 934B and 934C are used by controller 855 to adjust the timing at which fan speed adjustments are made or the amount of such adjustments. Controller 855 may adjust thresholds used to trigger a fan speed adjustment and/or the amount of fan speed adjustment per a given unit of the estimated chaffer loading. For example, signals from sensor 934B may indicate that the crop residue may be carrying an amount of grain that exceeds a predefined threshold. In response to such an occurrence, controller 855 may lower the amount by which the fan speed is increased for a given unit of estimated chaffer loading. In response to such an occurrence, controller 855 may increase the threshold for the estimated chaffer loading at which the fan speed is increased.

Figure 5:
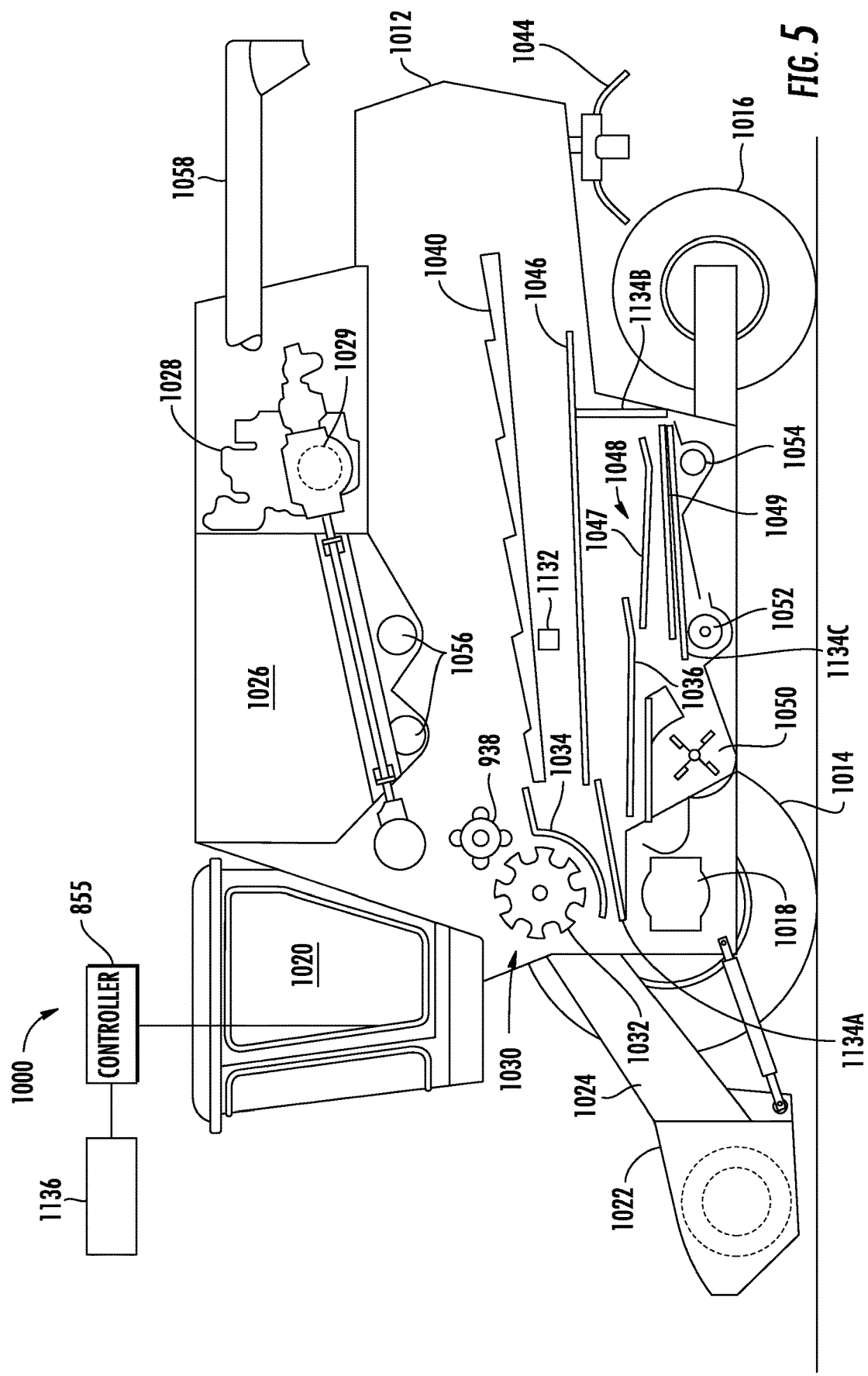
FIG. 5 is a side view of an example combine harvester with portions shown in section for purposes of illustration.

FIG. 5 is a diagram of an example harvester 1000 which adjust fan speed based upon a predicted forthcoming loading of a chaffer by crop material. As shown by FIG. 5, harvester 1000 comprises chassis 1012 and ground engaging wheels 1014 and 1016. Forward ground engaging wheels 1014 are driven by hydraulic motor 1018 located between the wheels. Harvesting platform 1022 extends forwardly from the chassis of the combine and is used for harvesting a crop in a field. After harvesting, the crop is then directed through feeder house 1024 and into the harvester. Clean grain compartment or tank 1026 is located behind the operator's cab 1020 at the top of the harvester. Behind compartment 1026 is transverse internal combustion engine 1028 which is the prime mover of the combine and its various components. The internal combustion engine 1028 is provided with a transmission 1029 for powering the various usage assemblies.

Between the sides of the combine, which form the chassis of the combine, is located the grain processing unit 1030. The grain processing unit 1030 separates the grain from the straw and chaff of the harvested crop. The feeder house 1024 directs the harvested grain to grain processing unit 1030 which comprises a multistage separation unit comprising multiple stages that progressively filter in separate grain from material other than grain. Grain processing unit 1030 comprises different grain processing stages. Grain processing unit 1030 comprises a first grain processing stage formed by a rotating transverse threshing cylinder 1032, transverse concave 1034, and rotating beater 1038. As the crop passes between cylinder 1032 and concave 1034, grain and chaff fall through the concave to pan 1036 and the remaining straw and unseparated grain is advanced to beater 1038.

After threshing, the straw in the crop is advanced to straw walkers 1040, and cleaning shoe assembly 1048. From beater 1038 the crop is advanced to the oscillating straw walkers 1040 which direct the straw to the rear of the combine where it is returned to the field by straw spreader 1044. Grain and chaff falling through the straw walkers falls onto oscillating slanted pan 1046 which directs the grain and chaff to pan 1036. The grain and chaff are directed from pan 1036 by overhead auger assemblies to cleaning shoe assembly 1048 which is used to separate the chaff from the grain. The grain and chaff falling onto the different grain separation frames (chaffers or sieves) of the cleaning shoe assembly 1048 encounters an air stream from fan 1050 which blows the lighter chaff out of the rear of the combine while the heavier grain falls through the cleaning shoe assembly and into clean grain receiving auger 1052.

Auger 1052 directs the clean grain to a clean grain elevator (not shown) which in turn directs the grain to clean grain compartment or tank 1026. Tailings, that is unthreshed heads of grain, fall into tailings auger 1054 which directs the unthreshed heads back to the threshing cylinder and concave. When the clean grain compartment is to be unloaded, transverse unloading augers 1056 direct the grain to the side of the compartment from where it comes into contact with a vertical unloading auger (not shown) which directs the clean grain through unloading tube 1058. During an unloading operation, tube 1058 would normally be extended outwardly from the side of the combine so that clean grain can be more readily directed into a wagon or truck.

The cleaner assembly 1048 is equipped with three sieving surfaces. The upper surface, or chaffer 1047, is adjusted to retain the large pieces of material other than grain, "MOG", while allowing the grain and small pieces of chaff to pass through. The sieve 1049 is located under the chaffer 1047. The sieve 1049 is adjusted to remove the small pieces of chaff, while allowing the cleaned grain to pass through. Each of these sieving surfaces is composed of adjustable louvers (not shown). A combination of louver openings and fan speed is used to clean the grain with a minimum of grain loss.

As further shown by FIG. 5, combine harvester 1000 additionally comprises straw walker pressure sensor 1132, material flow sensors 1134A, 1134B and 1134C (collectively referred to as material flow sensors 1134 and power monitor 936 (schematically shown). Straw walker pressure sensor 1132 comprises a sensor mounted to or formed upon portions of straw walker 1040 so as to sense forces exerted upon straw walker 1040 by crop material. For example, in one implementation, sensor 1132 may comprise an accelerometer. In another implementation, sensor 1132 may comprise a capacitive sensor coated upon a portion of straw walker 1040. In yet other implementations, sensor 1132 may comprise other pressure sensing devices coupled to straw walker 1040 so as to sense forces exerted upon straw walker 1040 by crop material.

Material flow sensors 1134 output signals indicating the flow of crop material. Material flow sensor 1134A is similar to sensor 38 or 244 described above. Material flow sensor 1134A Is located upstream of chaffer 1047 to output signals indicating the actual passage of the crop material itself flowing towards chaffer 1047.

Material flow sensors 1134B and 1134C are similar to sensors 248 and 246, respectively, described above. Material flow sensor 1134B is located downstream of chaffer 1047 and outputs signals indicating the actual passage of crop material after it has been blown off of the top of chaffer 1047 or is been blown off of the underlying sieves. At such a location, material flow sensor 1134B senses crop material being discharged from harvester 1000 which may largely consist of crop residue. Material flow sensor 1134B may output signals that indicate potential crop loss in the form of grain that is being discharged.

Material flow sensor 1134C is located downstream of chaffer 1047 and output signals indicating actual passive crop material that is passed through chaffer 1047. As such a location, material flow sensor 1134C outputs signals indicating the volume or mass of grain that is been extracted from the crop material. Such signals may be impacted by the amount of MOG still entrained with the grain. In other implementations, material flow sensor 1134C may be located immediately below chaffer 1047.

In the example illustrated, material flow sensors 1134 are each individually similar to material flow sensor 934 described above. In one implementation, each of material flow sensors 1134 may have an emitter-detector arrangement such as described in co-pending U.S. patent application Ser. No. 15/844,523 filed on Dec. 16, 2017 and entitled HARVESTER WITH ELECTROMAGNETIC PLANE CROP MATERIAL FLOW SENSOR by Dybro et al., the full disclosure of which is hereby incorporated by reference. As such, each of material flow sensors 1134 forms an electromagnetic plane that extends across a volume through which crop material flows.

In other implementations, material flow sensors 1134 are each a similar type of material flow sensor. In other implementations, the type of material flow sensors may vary amongst sensors 1134. For example, material flow sensor 1134A may be a different type as compared to material flow sensors 1134B and/or 1134C. in other implementations, material flow sensor 1134 may comprise other types of sensors that output signals indicating the passage of the crop material itself. For example, in other implementations, at least one of material flow sensor 1134 may comprise an impact plate situated across a portion of the region through which crop material flows, wherein the total crop flow is determined based upon signals from the impact plate and its location and size relative to the overall area through which crop material flows. In other implementations, other types of material flow sensors may be utilized.

Power monitor 1136 (schematically shown) comprises electronic circuitry that outputs signals indicating the ongoing occurrence power being consumed to drive at least one component of stream of chaffer 1047 that interacts with the crop material. In one implementation, power monitor 1136 output signals indicating the power consumed to reciprocatively drive straw walkers 1040. In some implementation, power monitor 1136 may additionally output signals indicating the power being consumed by components downstream of chaffer 1047 that interact with the flow of crop material. Such signals may be utilized in a fashion similar to the use of signals provided by crop material flow sensors 934B and 934C, similar to the use of the signals from downstream sensors 246 and 248 as described above. In one implementation, power monitor 1136 may monitor electrical power. For example, power monitor 1136 may monitor the voltage levels, wattage or other power measurements that vary in response to the load of crop material being interacted upon by the at least one crop interacting component. In other implementations, power monitor 1136 may monitor hydraulic or pneumatic power being consumed. Such signals are transmitted to controller 855.

Controller 855 is similar to controller 855 described above in that, in addition to controlling various other operations of harvester 1000 as described above, controller 855 additionally output control signals adjusting the speed of fan 1050 based upon a predicted forthcoming or future crop material load upon chaffer 1047 based upon signals from at least one sensor located upstream of chaffer 1047.

The predicted change in future crop material loading upon the chaffer 1047 may take various forms. In one implementation, the predicted change may be in relative terms such as an increase of X or a decrease of Y from a current crop material loading. In another implementation, the predicted change may be in absolute terms such as a crop material load having a value that exceeds a predefined threshold.

In one implementation, predicted forthcoming change in crop material loading upon chaffer 1047 is based directly upon changes in signals received from at least sensor upstream the chaffer and that correlate to actual load values (without actually calculating or determining an actual crop loading value (mass, volume). For example, controller 855 may output control signals changing the speed of fan 1050 or changing the scheduled speed of fan at a future time based upon changes in changes in pressure as indicated by sensor 1132, wherein such fan speed changes are made in response pressure values exceeding predefined thresholds without actually determining a value for the crop material load itself which may correspond to such speeds and/or pressures. In another implementation, controller 855 may calculate or determine an actual crop loading estimate based upon such signals, wherein the fan speed or the scheduling of future fan speed changes/adjustments is based upon the determined crop material loading. For example, controller 855 may utilize changes in pressure and/or changes in force from sensors 1132 to calculate a change in actual future crop material load, wherein the estimated change in actual future crop material load is used as a basis for adjusting fan speed.

Such fan speed adjustments may be timed or scheduled so as to coincide with the expected or determined time at which the chaffer 1047 is to experience the estimated load. In one implementation, such adjustments by controller 855 are automatic, without operator intervention. In another implementation, fan speed adjustment recommendations may be presented by controller 855 to an operator or manager for selection or approval prior to implementation. In some implementations, such fan speed adjustments are automatically carried out by controller 855 unless overridden by operator input.

In one implementation, such adjustments may be continuous and proportional to the predicted future load of crop material. For example, for every increase in the unit of force, the speed of fan 1050 is increased by a corresponding or proportional amount of speed. For every decrease and the unit of force, the speed of fan 1050 is decreased by a corresponding or proportional amount of speed.

In another implementation, such adjustments may be carried out by controller 855 in a stepwise manner in response to individual chaffer loading thresholds being satisfied. For example, in response to the predicted chaffer load exceeding a first threshold, the speed of fan 1050 may be increased to a first speed. In response to the predicted chaffer load exceeding a second threshold greater than the first threshold, the speed of fan 1050 may be increased to a second greater speed. Likewise, in response to the predicted chaffer load falling below a first threshold, the speed of fan 1050 may be decreased from a first speed to a second speed. In response to the predicted chaffer load falling below a second threshold, less than the first threshold, the speed of fan 1050 may be decreased from the second speed to a third speed.

In one implementation, such adjustments are continuously made. In other implementations, such adjustments may be carried out in a periodic fashion, wherein the fan speed is changed at predefined time intervals based upon the predicted forthcoming crop load upon chaffer 1047. For example, at every one minute interval, the estimated chaffer loading may be evaluated and the current speed of fan 1050 or the planned future speed of fan 1050 may be adjusted.

In one implementation, the speed of fan 1050 is immediately adjusted based upon a current estimated forthcoming chaffer load, despite that the chaffer loading per the estimate has yet to occur and will occur in the future. In yet another implementation, the time at which a speed of fan 1050 is adjusted is delayed based upon the time of the crop material to flow from the location at which at least one upstream sensor is located to the location of chaffer 1047 such that the time at which the speed of fan 1050 is adjusted coincides with the time at which the change in loading upon chaffer 1047 begins. In one implementation, the time delay is a predefined default time value. In another implementation, the time delay used by the controller is varied by the controller based upon signals indicating the speed at which crop material is flowing through the combine harvester or flowing from the location of at least one upstream sensor to the location of chaffer 1047. In one implementation, the location used for determining the delay for adjustment of the fan speed may be based upon the location of the sensor who signals have the greatest weight in the estimation of the forthcoming chaffer crop material loading.

In one implementation or selected mode of operation, controller 855 may adjust the speed of fan 1050 based upon signals from a single upstream of sensor, such as from pressure sensor 1132, or mass flow sensor 934A. In other implementations implementation, controller 855 may predict the forthcoming loading of chaffer 1047 using a combination of signals from multiple upstream sensors, such as from at least two of sensors 1132 and 1134A. In one implementation, different weightings (percent or proportion relative to signals of other sensors with respect to determining whether to change fan speed or to what extent a fan speed adjustment should be made) may be applied to the values or signals received from the different sensors based upon the relative accuracies of such sensors and/or based upon their proximity to chaffer 1047. For example, the values based upon signals from sensor 1134A, being closer to chaffer 1047, may be given a greater weight as compared to the values based upon signals from sensor 1132. In some implementations, different sensors may be each be given non-zero weightings.

In some implementations, the different signals from the different upstream sensors 1132 and 1134A may be given different weights based upon the current harvesting conditions. For example, sensor 1132 may be more accurate for a given harvesting condition as compared to sensor 1134A. Alternatively, sensor 1132 may be less accurate for another given harvesting condition as compared to the other upstream sensors. Based upon the dynamic determination of the ongoing harvesting condition, different weights may be applied. In some implementations, different sensors may each be given nonzero weights. In some circumstances, a particular sensor or a group of particular sensors may be given zero weightings under certain harvesting conditions, where signals from the sensors are not employed. Examples of such different harvesting conditions that may trigger the application of different weightings to the signals from the different types of sensors 1132 and 1134A may include, but are not limited to, a grain moisture content, combine harvester orientation (pitch or roll), crop material flow speed, temperature, type of crop or type of grain and the like. Although harvester 1000 is illustrated as comprising the different upstream sensors 1132 and 1134A, in other implementations, additional upstream sensors may be provided, wherein signals from the upstream sensors may be used independently for validation or in combination with one another by controller 855 to predict forthcoming chaffer loading which is used to adjust the speed of fan In one implementation, the forthcoming chaffer loading estimate may be based upon signals from at least one of upstream sensors 1132 and 1134A, wherein the signals from the downstream sensors 1134B and 1134C provide a closed loop feedback for adjusting future chaffer loading estimates based upon signals from those upstream sensors. For example, the mass or volume of crop material that is passed chaffer 1047 as indicated by a combination of the signals from downstream sensors 1134B and 1134C may be compared to the prior predicted chaffer loading. In such an implementation, discrepancies between such values may trigger a change threshold levels for sensed parameters that correlate to crop loading and that are used for changing fan speed or may trigger a change in conversion factors used to convert the value of signals from sensors 1132 into actual crop material load values.

In one implementation, the predicted forthcoming chaffer loading may be based upon signals from at least one of the upstream sensors 1132, 1134A, wherein the signals from the downstream sensors 1134B and 1134C are used by controller 855 to adjust the timing at which fan speed adjustments are made or the amount of such adjustments. Controller 855 may adjust thresholds used to trigger a fan speed adjustment and/or the amount of fan speed adjustment per a given unit of the estimated chaffer loading. For example, signals from sensor 1134B may indicate that the crop residue may be carrying an amount of grain that exceeds a predefined threshold. In response to such an occurrence, controller 855 may lower the amount by which the fan speed is increased for a given unit of estimated chaffer loading. In response to such an occurrence, controller 855 may increase the threshold for the estimated chaffer loading at which the fan speed is increased.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A combine harvester comprising:
   a chaffer to separate residue from grain in crop material;
   a fan to direct air across and through the chaffer to carry the residue from the harvester;
   a sensor to output signals indicating a characteristic of the crop material upstream of the chaffer; and
   a controller to adjust a speed of the fan based on signals from the sensor; and
   a second sensor downstream the chaffer, wherein the second sensor is to sense grain flow into a holding tank of the combine harvester and wherein the controller is to adjust the speed of the fan based upon a combination of signals from the sensor and the second sensor.

2. The combine harvester of claim 1 further comprising a rotor or threshing cylinder to engage and thresh the crop material prior to the crop material reaching the chaffer, wherein the signals output by the sensor indicate a throughput of the rotor or threshing cylinder, wherein the sensor comprises a sensor to sense forces exerted upon the rotor or threshing cylinder by the crop material.

3. The combine harvester of claim 1 further comprising a rotor or threshing cylinder to engage and thresh the crop material prior to the crop material reaching the chaffer, wherein the signals output by the sensor indicate a throughput of the rotor or threshing cylinder, wherein the signals output by the sensor indicating the throughput of the rotor are based upon power consumed to rotate the rotor or threshing cylinder.

4. The combine harvester of claim 1 further comprising a rotor or threshing cylinder to engage and thresh the crop material prior to the crop material reaching the chaffer, wherein the signals output by the sensor indicate a throughput of the rotor or threshing cylinder, wherein the signals output by sensor indicating the throughput of the rotor or threshing cylinder are based upon a rotational speed of the rotor or threshing cylinder.

5. The combine harvester of claim 1 further comprising a rotor or threshing cylinder to engage and thresh the crop material prior to the crop material reaching the chaffer, wherein the sensor comprises a capacitive sensor coated upon a portion of the rotor or threshing cylinder.

6. The combine harvester of claim 1 further comprising a rotor or threshing cylinder to engage and thresh the crop material prior to the crop material reaching the chaffer, wherein the sensor comprises an accelerometer mounted to the rotor or threshing cylinder.

7. The combine harvester of claim 1 further comprising a rotor or threshing cylinder to engage and thresh the crop material prior to the crop material reaching the chaffer, wherein the sensor comprises a pressure sensor carried by the rotor or threshing cylinder.

8. The combine harvester of claim 1 further comprising a rotor or threshing cylinder to engage and thresh the crop material prior to the crop material reaching the chaffer, wherein the sensor comprises an emitter-detector arrangement.

9. The combine harvester of claim 1 further comprising a third sensor to output third signals indicating a characteristic of the crop material upstream of the chaffer, wherein the controller is to differently weight the signals output by the sensor and the third signals and is to adjust the speed of the fan based on a combination of the differently weighted signals output by the sensor and the third signals.

10. The combine harvester claim 1, wherein the controller is to apply first weight to the signals output by the sensor in response to a first harvesting condition and is to apply second weight, different than the first weight, to the signals output by the sensor in response to a second harvesting condition.

11. A combine harvester comprising:
    a chaffer to separate residue from grain in crop material;
    a fan to direct air across and through the chaffer to carry the residue from the harvester;
    a sensor to output signals indicating a characteristic of the crop material upstream of the chaffer;

a controller to adjust a speed of the fan based on signals from the sensor;

a ground speed sensor, wherein the controller is to adjust the fan speed based on a combination of signals from the sensor and the ground speed sensor;

a second sensor to output signals indicating crop material downstream the chaffer, wherein the controller to adjust the fan speed based upon a combination of signals from the sensor, signals from the ground speed sensor and signals from the second sensor; and a rotor or threshing cylinder to engage and thresh the crop material prior to the crop material reaching the chaffer, wherein the signals output by the sensor indicate a throughput of the rotor or threshing cylinder.

12. The combine harvester of claim 11, wherein the sensor comprises a pressure sensor to sense forces exerted upon the rotor or threshing cylinder by the crop material.

13. The combine harvester of claim 11, wherein the signals output by the sensor indicating the throughput of the rotor or threshing cylinder are based upon power consumed to rotate the rotor or threshing cylinder.

14. The combine harvester of claim 11, wherein the signals output by sensor indicating the throughput of the rotor or threshing cylinder are based upon a rotational speed of the rotor or threshing cylinder.

15. A combine harvester comprising:
a chaffer to separate residue from grain in crop material;
a fan to direct air across and through the chaffer to carry the residue from the harvester;
a sensor to output signals indicating a characteristic of the crop material upstream of the chaffer
a rotor or threshing cylinder to engage and thresh the crop material prior to the crop material reaching the chaffer; and
a controller to adjust a speed of the fan based on signals from the sensor, wherein the signals output by the sensor indicate the throughput of the rotor or threshing cylinder based upon either the rotational speed of the rotor or threshing cylinder or the power consumed to rotate the rotor or threshing cylinder.

16. The combine harvester of claim 15, wherein the signals output by the sensor indicating the throughput of the rotor or threshing cylinder are based upon the power consumed to rotate the rotor or threshing cylinder.

17. The combine harvester of claim 15, wherein the signals output by sensor indicating the throughput of the rotor or threshing cylinder are based upon the rotational speed of the rotor or threshing cylinder.

18. The combine harvester of claim 15 further comprising a second sensor to output second signals indicating a characteristic of the crop material upstream of the chaffer, wherein the controller is to differently weight the signals output by the sensor and the second signals and is to adjust the speed of the fan based a combination of the differently weighted signals output by the sensor and the second signals.

19. The combine harvester claim 18, wherein the controller is to apply first weight to the signals output by the sensor in response to a first harvesting condition and is to apply second weight, different than the first weight, to the signals output by the sensor in response to a second harvesting condition.

20. A combine harvester comprising:
a chaffer to separate residue from grain in crop material;
a fan to direct air across and through the chaffer to carry the residue from the harvester;
a sensor to output signals indicating a characteristic of the crop material upstream of the chaffer, wherein the signals output by the sensor indicate the moisture content of the crop material;
a rotor or threshing cylinder to engage and thresh the crop material prior to the crop material reaching the chaffer;
a second sensor to output second signals indicating the throughput of the rotor or threshing cylinder; and
a controller to adjust a speed of the fan based on a combination of the signals from the sensor and the second signals from the second sensor.

* * * * *